(12) United States Patent
Yamakado et al.

(10) Patent No.: US 8,239,096 B2
(45) Date of Patent: Aug. 7, 2012

(54) MOTION CONTROL UNIT FOR VEHICLE BASED ON JERK INFORMATION

(75) Inventors: Makoto Yamakado, Tsuchiura (JP); Shinya Imura, Toride (JP); Masato Abe, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/339,997

(22) Filed: Dec. 29, 2011

(65) Prior Publication Data

US 2012/0101657 A1    Apr. 26, 2012

Related U.S. Application Data

(63) Continuation of application No. 13/151,904, filed on Jun. 2, 2011, now Pat. No. 8,112,200, which is a continuation of application No. 12/121,323, filed on May 15, 2008, now Pat. No. 7,979,180.

(30) Foreign Application Priority Data

May 18, 2007    (JP) .................................. 2007-132987

(51) Int. Cl.
*B60G 17/016*    (2006.01)

(52) U.S. Cl. .......................................... 701/38; 701/37

(58) Field of Classification Search ............... 701/38, 701/37, 1, 41, 70, 71; 280/5.506–5.508, 280/5.504; 340/440, 436; 303/146, 147, 303/121; 180/422, 242; 702/142
See application file for complete search history.

(56) References Cited

U.S. PATENT DOCUMENTS

| | | | |
|---|---|---|---|
| 4,674,327 A | 6/1987 | Swindall et al. | |
| 6,086,168 A | 7/2000 | Rump | |
| 6,963,797 B2 | 11/2005 | Salib et al. | |
| 7,096,103 B2 | 8/2006 | Salib et al. | |
| 7,657,353 B2 * | 2/2010 | Yasui et al. | 701/38 |
| 2002/0161505 A1 | 10/2002 | Reich et al. | |
| 2003/0037977 A1 | 2/2003 | Tatara et al. | |
| 2004/0119335 A1 | 6/2004 | Szabo et al. | |

FOREIGN PATENT DOCUMENTS

| | | |
|---|---|---|
| DE | 196 32 943 A1 | 2/1998 |
| DE | 197 08 508 A1 | 3/1998 |
| DE | 100 11 779 A1 | 6/2001 |
| JP | 5-16789 A | 1/1993 |
| JP | 2002-340925 A | 11/2002 |

OTHER PUBLICATIONS

European Search Report dated Jul. 27, 2010 (eight (8) pages).

(Continued)

*Primary Examiner* — Thomas Black
*Assistant Examiner* — Marthe Marc-Coleman
(74) *Attorney, Agent, or Firm* — Crowell & Moring LLP

(57) ABSTRACT

In a motion control system for a vehicle including control means for controlling a yaw moment of the vehicle; first detection means for detecting a longitudinal velocity (V) of the vehicle; second detection means for detecting a lateral jerk (Gy_dot) of the vehicle; and third detection means for detecting a yaw angular acceleration (r_dot) of the vehicle, the yaw moment of the vehicle is controlled by the control means so that a difference between the yaw angular acceleration (r_dot) detected by the third detection means and a value (Gy_dot/V) obtained by the lateral jerk (Gy_dot) of the vehicle detected by the second detection means by the longitudinal velocity (V) detected by the first detection means becomes small.

6 Claims, 10 Drawing Sheets

OTHER PUBLICATIONS

Yamakado, Makoto et al., "Understanding and Evaluation of Driver and Vehicle Dynamic Characteristics based upon Jerk Information—An Investigation of Longitudinal and Lateral Integrated Control-", 20075258, pp. 13-18.

Yamakado, Makoto et al., Proposal of the longitudinal driver model in coordination with steering action based upon Jerk Information—A driver model derived from voluntary driving that has vehicle dynamic rationality-, 20075899, pp. 21-26.

* cited by examiner

MOTION CONTROL UNIT FOR VEHICLE BASED ON JERK INFORMATION

This application is a continuation of U.S. application Ser. No. 13/151,904, filed Jun. 2, 2011 which is a continuation of U.S. application Ser. No. 12/121,323, filed May 15, 2008 which claims priority from Japanese application serial No. 2007-132987, filed on May 18, 2007, the content of which is hereby incorporated by reference into this application.

BACKGROUND OF THE INVENTION (1) Field of the Invention

The present invention relates to a system for performing a motion control of a vehicle, and more particularly, to a system for controlling a yaw moment based on lateral jerk information.

(2) Description of Related Art

A vehicle control system for controlling a yaw moment of the vehicle is disclosed in, for example, JP-A-10-16599. Here, in general, a torque difference is generated between left and right wheels of the vehicle so as to unbalance left and right drive forces or brake forces generated between a road surface and the left and right wheels, thereby generating the yaw moment of the vehicle to control the movement of the vehicle.

As to control logic for determining a target value of a torque difference generated between the left and right wheels of the vehicle, JP-A-10-16599 discloses a method for setting the target value of the torque difference to a value proportional to a handle angular velocity. According to JP-A-10-16599, if the torque difference proportional to the handle angular velocity is generated, the yaw moment proportional to the handle angular velocity is generated, to improve the initial response performance of the yaw moment of the vehicle with respect to a handle operation.

BRIEF SUMMARY OF THE INVENTION

However, like the control logic disclosed in JP-A-10-16599, when the target value of the torque difference generated between the left and right wheels of the vehicle is set to the value proportional to the handle angular velocity, it is not possible to surely handle a variation in dynamics (lateral motion performance of the vehicle) of the vehicle.

In a case where yaw response stability deteriorates due to a high velocity of the vehicle, a tire arrives at a nonlinear area in a lateral skid state of the vehicle, a load of each wheel varies due to an acceleration, or a lateral force is reduced due to an increase in longitudinal force of the tire, an original restoration yaw moment of the vehicle varies. Due to a composition yaw moment of the restoration yaw moment and a control input, the vehicle will be unstable in some situation.

An object of the invention is to provide a motion control system for a vehicle capable of varying a yaw moment control amount in accordance with a variation in dynamics of the vehicle.

In order to solve the above-described problems, the present invention mainly adopts the following configuration.

In a motion control system for a vehicle including: control means for controlling a yaw moment of the vehicle; first detection means for detecting a longitudinal velocity (V) of, the vehicle; and second detection means for detecting a lateral jerk (Gy_dot) of the vehicle, the yaw moment of the vehicle is controlled on the basis of a value (Gy_dot/V) obtained by dividing the lateral jerk (Gy_dot) of the vehicle detected by the second detection means by the longitudinal velocity (V) of the vehicle detected by the first detection means.

In addition, in the motion control system for the vehicle further including third detection means for detecting a yaw angular acceleration (r_dot) of the vehicle, the yaw moment of the vehicle is controlled by the control means so that a difference between the yaw angular acceleration (r_dot) of the vehicle detected by the third detection means and the value (Gy_dot/V) obtained by dividing the lateral jerk (Gy_dot) of the vehicle by the longitudinal velocity (V) of the vehicle becomes small.

According to the invention, since the control yaw moment amount can be controlled in accordance with a variation in lateral dynamics of the vehicle including an transient acceleration or deceleration state of the vehicle, it is possible to realize a stable driving.

Other objects, features, and advantages of the invention will be, or will become, apparent in the detailed description of the invention based on the accompanying drawings.

BRIEF DESCRIPTION OF THE SEVERAL VIEWS OF THE DRAWING

FIG. 2A is a schematic view illustrating a steady state cornering, FIG. 2B is a schematic view illustrating a state where a positive moment is added in terms of a steering operation, FIG. 2C is a schematic view illustrating a state where a positive moment is added by a left and right differential brake and drive input, and FIG. 2D is a schematic view illustrating a state where a positive moment is added by a vertical load transfer from a rear wheel to a front wheel in terms of a braking operation.

FIG. 3A is a schematic view illustrating a steady state cornering, FIG. 3B is a schematic view illustrating a state where a negative moment is input in terms of the steering operation, FIG. 3C is a schematic view illustrating a state where a negative moment is added by the left and right differential brake and drive input, and FIG. 3D is a schematic view illustrating a state where a negative moment is added by a vertical load transfer from a rear wheel to a front wheel in terms of the braking operation.

FIG. 5A is a schematic view illustrating a state without a sideslip angle and FIG. 5B is a schematic view illustrating a state with a sideslip angle.

DETAILED DESCRIPTION OF THE INVENTION

Figure 1:
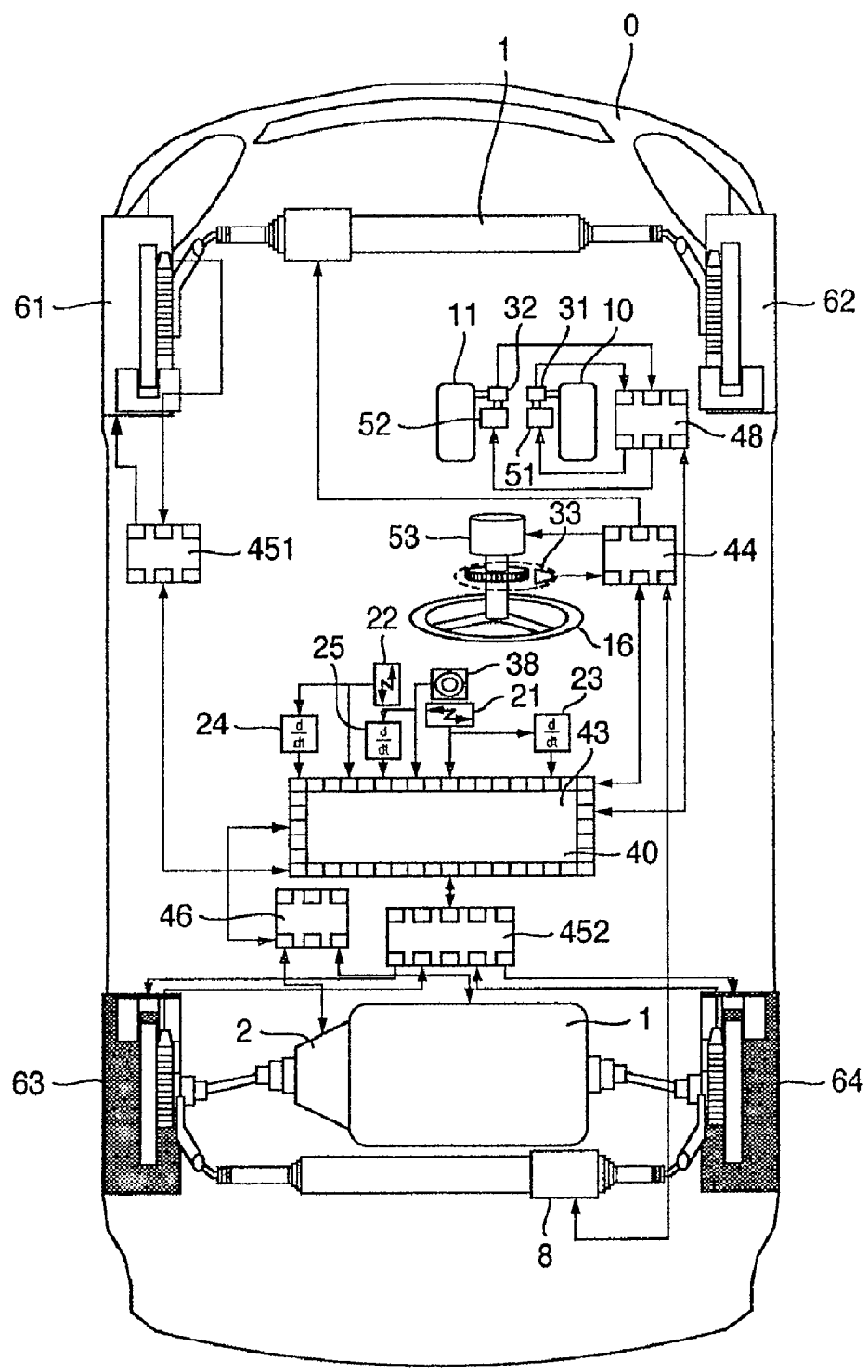
FIG. 1 is a view illustrating an overall configuration of a motion control system for a vehicle.

Hereinafter, a motion control system for a vehicle will be described in detail with reference to FIGS. 1 to 10. FIG. 1 is a view illustrating an overall configuration of a motion control system for a vehicle. In this embodiment, a vehicle 0 is configured as a so-called by-wire-system, in which a mechanical connection does not exist among a driver, a steering mechanism, an acceleration mechanism, and a deceleration mechanism. Next, a configuration and an operation of the motion control system for the vehicle according to this embodiment will be described in each item thereof.

<Driving>

The vehicle 0 is a rear wheel driven vehicle (Rear Motor Rear Driver: RR vehicle) (a drive type is not directly involved with this embodiment). A drive force distributing mechanism 2 connected to a motor 1 is mounted therein so as to be capable of freely distributing torque from the motor to left and right wheels.

First, a detailed system configuration will be described. A left front wheel 61, a right front wheel 62, the left rear wheel 63, and the right rear wheel 64 are respectively mounted with a brake rotor and a vehicle wheel velocity detecting rotor (encorder), and a vehicle body is mounted with a vehicle velocity pickup, thereby being configured to detect a vehicle wheel velocity of each vehicle wheel. An amount that the driver presses an accelerator pedal 10 is detected by an accelerator position sensor 31 and is calculated by a central control 40 via a pedal control 48. In this calculation process, torque distribution information is included in accordance with a yaw moment control according to this embodiment. Then, a powertrain controller 46 controls an output of the motor 1 in accordance with the control amount. In addition, the output of the motor 1 is distributed to the left rear wheel 63 and the right rear wheel 64 at an appropriate ratio via the drive force distributing mechanism 2 controlled by the powertrain controller 46.

The accelerator pedal 10 is connected to an accelerator reaction motor 51 and a reaction control is carried out by the pedal controller 48 on the basis of a calculation command of the central controller 40.

<Braking>

The left front wheel 51, the right front wheel 52, the left rear wheel 53, and the right rear wheel 54 are respectively provided with the brake rotor, and the vehicle body is mounted with calipers for decelerating the vehicle wheels by interposing the brake rotor between pads (not shown). The calipers are of a hydraulic type or an electric type in which each caliper has an electric motor.

Each caliper is basically controlled by a brake controller 451 (for the front wheel) and 452 (for the rear wheel) on the basis of the calculation command of the central controller 40. In addition, as described above, each vehicle wheel velocity is input to the brake controllers 451 and 452. An absolute vehicle velocity can be estimated by averaging the vehicle wheel velocity of the front wheel (non-driving wheel) from the vehicle wheel velocities of the four wheels.

In this embodiment, by using a signal of an acceleration sensor for detecting the vehicle wheel velocity and the longitudinal acceleration of the vehicle, even when the vehicle wheel velocities of the four wheels decrease at the same time, the absolute vehicle velocity (V) can be measured accurately (such an absolute vehicle velocity can be measured, for example, by the technique disclosed in JP-A-05-16789 and the like). In addition, by obtaining a difference between the left and right vehicle wheel velocities of the front wheel (non-driving wheel), a yaw rate of the vehicle body is estimated (r_w). Then, the signal as common information is monitored in the central controller 40 at a normal time.

A brake pedal 11 is connected to a brake reaction motor 52, and a reaction control is carried out by the pedal controller 48 on the basis of the calculation command of the central controller 40.

<Overall Control of Braking and Driving>

In this embodiment, there is provided three modes (as described below, Yaw Moment Addition in terms of Steering Operation, Yaw Moment Addition in terms of Left and Right Differential Brake and Drive Input, and Yaw Moment Addition in terms of Load Transfer from Front Wheel to Rear Wheel (see FIG. 7)) for realizing a yaw moment control described below, and one of them is 'Yaw Moment Addition in terms of Left and Right Differential Brake and Drive Input'. Although a different brake force or drive force is generated in the left and right vehicle wheels, a difference between the left and right brake forces or drive forces leads to the yaw moment.

Accordingly, in order to realize the difference, an operation, in which a drive operation is performed on one side and a brake operation is performed on the other side, different from a general operation may be carried out. In such a circumstance, an overall control command is overall determined by the central controller 40, and the control is adequately carried out in terms of the brake controller 451 (for the front wheel) and 452 (for the rear wheel), the powertrain controller 46, the motor 1, and the drive force distribution mechanism 2.

<Steering>

A steering system of the vehicle 0 is configured as a four wheel steering system, a steer-by-wire structure without a mechanical connection between a steering angle of the driver and a turning angle of a tire. The steering system includes a front power steering 7 having therein a steering angle sensor (not shown), a steering 16, a driver steering angle sensor 33, and a steering controller 44. An amount that the steering 16 is steered by the driver is detected by the driver steering angle sensor 33 and a calculation process is carried out by the central controller 40 via the steering controller 44. In the calculation process, the steering angle input in accordance with the yaw moment control according to this embodiment is included. Then, the steering controller 44 controls the front power steering 7 and the rear power steering 8 in accordance with the steering amount.

The steering 16 is connected to the steering reaction motor 53, and a reaction control is carried out by the steering controller 44 on the basis of the calculation command of the central controller 40. An amount that the driver presses the brake pedal 11 is detected by a brake pedal position sensor 32, and a calculation process is carried out by the central controller 40 via the pedal controller 48.

<Sensor>

Next, a motion sensor group according to this embodiment will be described. As shown in FIG. 1, a lateral acceleration sensor 21, a longitudinal acceleration sensor 22, and a yaw rate sensor 38 (a rotation angular velocity of the vehicle) are arranged around a gravity center point of the vehicle. In addition, differential circuits 23 and 24 are mounted therein so as to obtain jerk information by differentiating the outputs of the respective acceleration sensors. A differential circuit 25 is mounted therein so as to obtain a yaw angular acceleration signal by differentiating the output of the yaw rate sensor 38.

In this embodiment, although the differential circuits are depicted to be installed in each sensor so as to make sure the existence of the differential circuits, the differential process may be carried out after the acceleration signals are directly input to the central controller 40 so as to perform various calculation processes. Accordingly, the yaw angular acceleration of the vehicle body may be obtained by performing the differential process in the central controller 40 using the estimated yaw rate obtained from the front vehicle wheel velocity sensor. In addition, although the acceleration sensor and the differential circuit are used to obtain a jerk, an already known jerk sensor (for example, see JP-A-2002-340925) may be used.

<Yaw Moment Controlling>

Next, the yaw moment control in terms of a drive force distribution to the left and right vehicle wheels will be described with reference to FIGS. 2A to 2D and FIGS. 3A to 3D. In this embodiment, the yaw moment applied to the vehicle 0 is controlled by using three methods of 'Yaw Moment Addition in terms of Steering Operation', 'Yaw Moment Addition in terms of Left and Right Differential Brake and Drive Input', and 'Yaw Moment Addition in terms of Vertical Load Transfer from Front Wheel to Rear Wheel'. FIGS. 2A to 2D are schematic views illustrating a state where three types of positive yaw moment inputs are carried out when a vehicle turns in a counterclockwise direction. FIGS. 3A to 3D are schematic views illustrating a state where three types of negative yaw moment inputs are carried out when a vehicle turns in a counterclockwise direction.

Figure 2A:
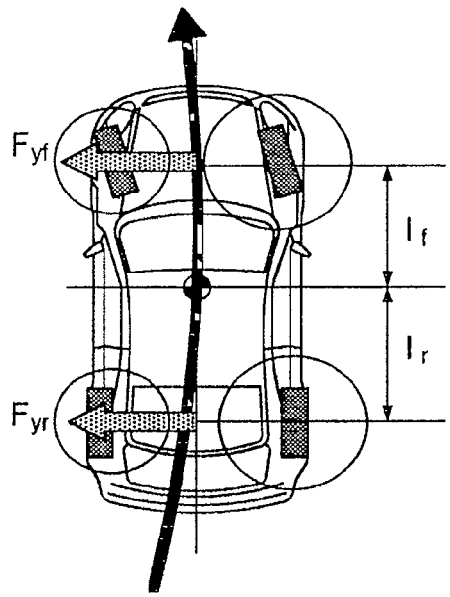
FIGS. 2A to 2D are schematic views illustrating a state where three types of positive yaw moment inputs are carried out when a vehicle turns in a counterclockwise direction.

FIGS. 2A to 2D are views illustrating three methods upon inputting the positive yaw moment from the standard state shown in FIG. 2A. First, a lateral motion equation and a yawing (rotation) motion equation of the vehicle 0 in the standard state shown in FIG. 2A are expressed.

$$mG_y = F_{yf} + F_{yr} \quad \text{[Equation 1]}$$

$$M = I_z \dot{r} = 0 = F_{yf} l_f - F_{yr} l_r \quad \text{[Equation 2]}$$

Here, m: a mass of the vehicle 0, Gy: a lateral acceleration applied to the vehicle 0, Fyf: a lateral force of the two front wheels, Fyr: a lateral force of the two rear wheels, M: a yaw moment, Iz: a yawing inertia moment of the vehicle 0, r_dot: a yaw angular acceleration of the vehicle 0 (r denotes a yaw rate), lf: a distance between the gravity center point of the vehicle 0 and a front axle, and lr: a distance between the gravity center point of the vehicle 0 and a rear axle. In the standard state, the yawing motion is balanced (yaw moment is zero), and the angular acceleration is zero.

Figure 2B:
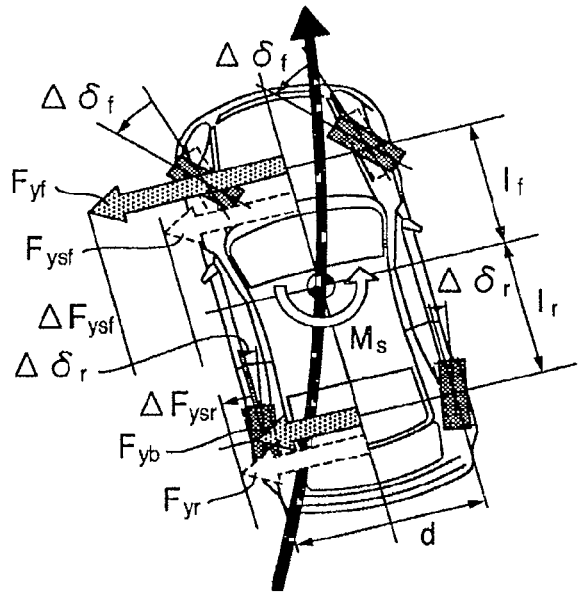

FIG. 2B is a state where 'Yaw Moment Addition in terms of Steering Operation' is carried out from the standard state shown in FIG. 2A. Since the front wheel steering angle increases by Δδf and the rear wheel steering angle increases by Δδr compared with the steady state cornering shown in FIG. 2A, the lateral force of the two front wheels increases from Fyf to Fysf and the lateral force of the two rear wheels decreases from Fyr to Fyrf, and according to Equation 2, the positive moment (Ms) is generated as the following Equation 3.

$$M_s = (F_{ysf} l_f - F_{ybr} l_r) - (F_{ysr} l_f - F_{yr} l_r) = (l_f \Delta F_{ysf} + l_r \times F_{ysr}) > 0$$

In addition, in this embodiment, although the four wheel steering vehicle capable of steering the rear wheel is supposed, the positive moment can be generated from a general front wheel steering vehicle.

Figure 2C:
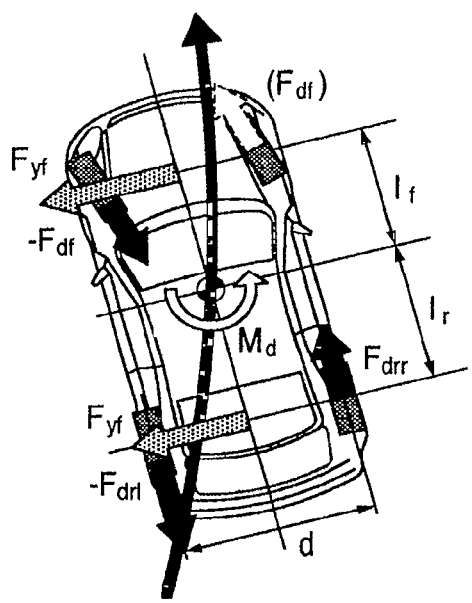

Next, FIG. 2C is a state where 'Yaw Moment Addition in terms of Left and Right Differential Brake and Drive Input' is carried out from the standard state shown in FIG. 2A, in which a brake force −Fdrl is applied to the left rear wheel 63, a drive force Fdrr is applied to the right rear wheel 64, and a brake force −Fdf is applied to the left front wheel 61. In this case, $$M_d = F_{yf} l_f - F_{yr} l_r + \frac{d}{2}(F_{drl} + F_{drr} + F_{df}) > 0 \quad \text{[Equation 4]}$$

Here, d denotes a tread (distance between the left and right vehicle wheels as shown in the drawing). In addition, $$F_{drl} + F_{drr} + F_{df} = 0$$

When the control is carried out in this way, the yaw moment can be generated without generating the longitudinal acceleration or deceleration other than the front wheel driven vehicle (in this example, without driving the right front wheel 62). That is, the yaw moment can be added without giving an unpleasant feeling to the driver.

Figure 2D:
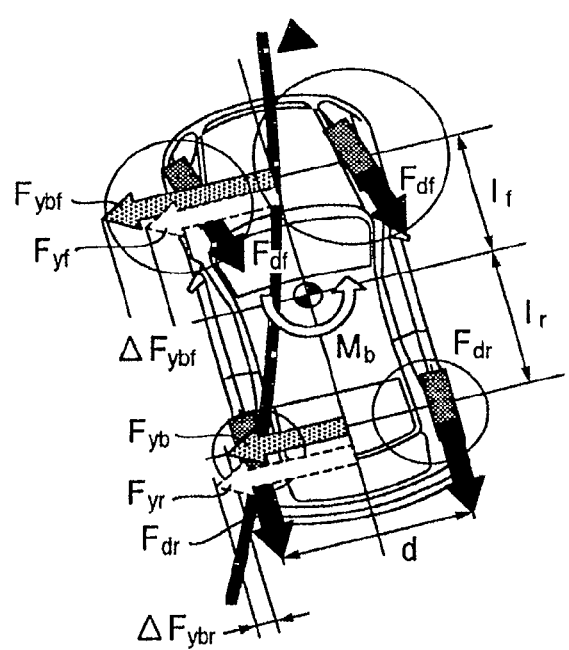
Figure 3A:
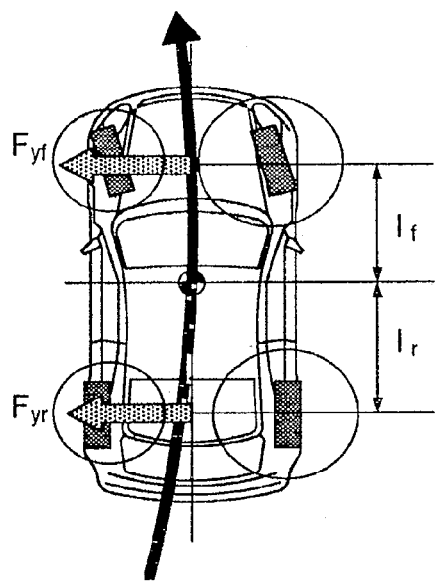
FIGS. 3A to 3D are schematic views illustrating a state where three types of negative yaw moment inputs are carried out when a vehicle turns in a counterclockwise direction.
Figure 3B:
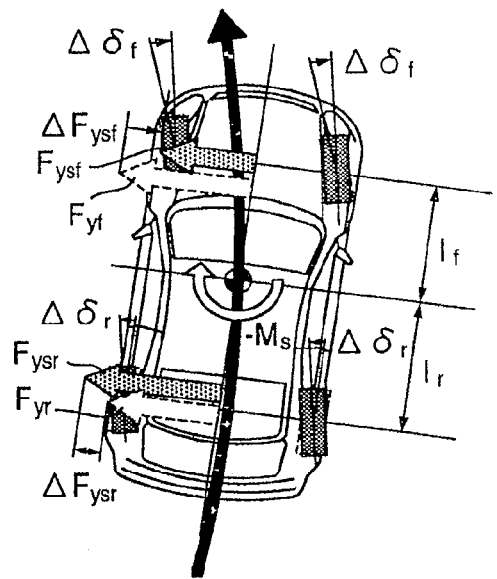
Figure 3C:
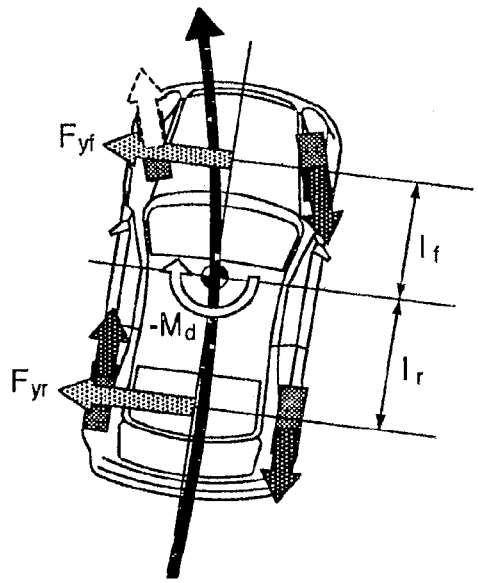
Figure 3D:
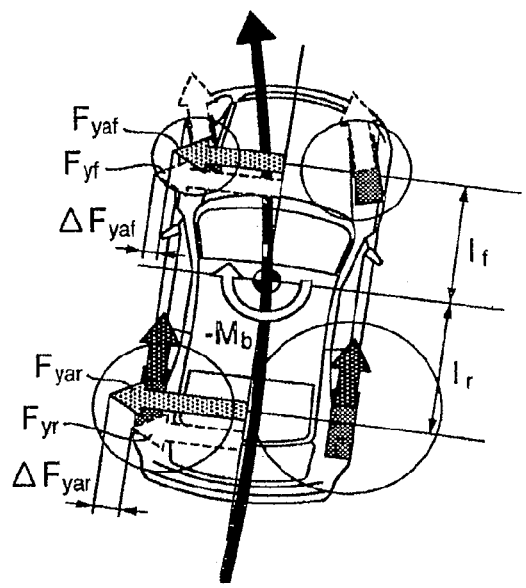

Next, FIG. 2D is a method in which a vertical load transfer is positively generated from the rear wheel to the front wheel by applying the brake force and an original restoration yaw moment of the vehicle reduces, thereby generating the yaw moment.

The phenomenon of the yaw moment addition in terms of the vertical load transfer is such that the yaw moment due to the acceleration or deceleration during a steady state cornering action is proportional to a value obtained by multiplying the lateral force by the longitudinal acceleration within a range in which the lateral force of the tire is proportional to the vertical load as disclosed in p. 54 to 60 of 'Improvement of Vehicle Motion Performance in terms of Yaw Moment Control' written by SHIBAHATA et al. and published by 'SOCIETY OF AUTOMOTIVE ENGINEERS OF JAPAN, INC., Vol. 47, No. 12, 1993.' The phenomenon occurs when a friction circle of the front wheel increases in accordance with the deceleration −GX and a friction circle of the rear wheel decreases in accordance with the deceleration −GX from the state shown in FIG. 2A. Here, −Gx is $$G_x = \frac{1}{m}(2F_{bf} + F_{br}) \quad \text{[Equation 6]}$$

Although the deformation of Equations is omitted until the input yaw moment becomes a value obtained by multiplying the lateral force by the longitudinal acceleration, $$M_d = (F_{ybf} l_f - F_{ybr} l_r) - (F_{yf} l_f - F_{yr} l_r) = (l_f \Delta F_{ybf} + l_r \Delta F_{ybr}) > 0$$

is obtained, and the positive yaw moment can be input.

Meanwhile, FIGS. 3A to 3D are methods in which the negative yaw moment is input in the same way as those shown in FIGS. 2A to 2D. Although the detailed description is omitted because the method is the same as that of the positive yaw moment input method shown in FIGS. 2A to 2D, the moment in the restoration direction (clockwise direction shown in FIGS. 3B, 3C, and 3D) is obtained in such a manner that the steering operation is carried out so that the steering angle decreases or the steering operation is carried out so that a phase of the rear wheel becomes the same as that of the front wheel, the brake or drive operation is carried out so that an inverse brake or drive force is applied, the load movement is carried out so that an acceleration is performed to increase a load of the rear wheel, the lateral force of the rear wheel comparatively increases, and the lateral force of the front wheel decreases.

As described above, the vehicle according to this embodiment can generate both the positive and negative yaw moment on the basis of the command of the central controller 40.

Next, a yaw moment calculation method for a specific yaw moment command will be described in detail. In addition, an outline of the above-described yaw moment generation method is introduced in various documents.

<Technical Background of Vehicle Motion Dynamics>

Figure 4:
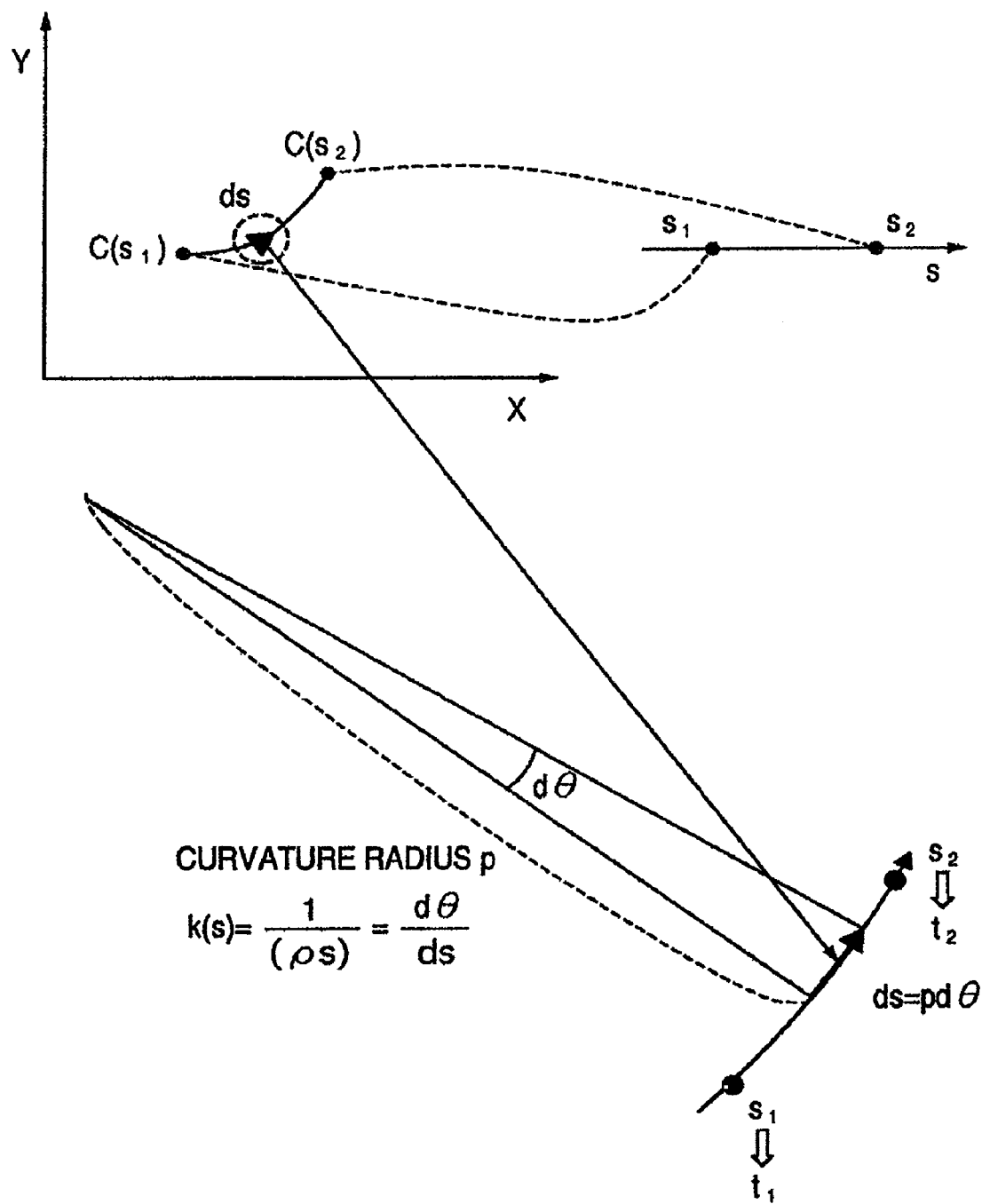
FIG. 4 is a diagrammatic view illustrating a concept of a curvature of a locus and an arc length along the locus for showing a case where a vehicle turns along a curve.

As shown in FIG. 4, this corresponds to a state where the vehicle turns along a certain curve. In a curve of $C(s)=(X(s), Y(s))$ of the coordinate system $(X, Y)$ fixed to a ground, s denotes a distance along the curve. When a curvature of a locus is denoted by $\kappa(=1/\rho$ ($\rho$: turning radius)), generally $\kappa$ is shown by using an arc length parameter (s) along the locus as shown in Equation 8.

$$\kappa(s) = \frac{1}{\rho(s)} = \frac{d\theta}{ds} \qquad \text{[Equation 8]}$$

That is, when a variation in angle (d$\theta$) occurs upon moving along the curve by a certain distance (ds), the variation is called a curvature $\kappa(d\theta/ds)$.

As it is well known, a locus of the vehicle when a handle is steered at a stable angular velocity during a stable vehicle velocity is called a clothoid curve which is often used for designing a road. This curve is $$\frac{d\kappa(s)}{ds} = \frac{d}{ds}\frac{d\theta}{ds} = \frac{d^2\theta}{ds^2} = const = \kappa_{crothoid} \qquad \text{[Equation 9]}$$

A variation rate of this curve is uniform with respect to the movement distance. Accordingly, when the vehicle travels along the clothoid curve at a uniform velocity (u), $$u = \frac{ds}{dt} = const \qquad \text{[Equation 10]}$$

A time variation of the curvature of the vehicle becomes stable (which may be supposed that the arc length parameter changes to the time parameter t).

$$\frac{d\kappa(s)}{dt} = \frac{ds}{dt}\frac{d\kappa(s)}{ds} = u \cdot \kappa_{crothoid} = const \qquad \text{[Equation 11]}$$

Meanwhile, from the definition of the curvature $\kappa$, $\kappa(s)$ is expressed by Equation 12.

$$\kappa(s) = \frac{1}{\rho(s)} = \qquad \text{[Equation 12]}$$

$$\frac{d\theta}{ds} \Rightarrow \theta = \psi_{(Yaw\_Angle)} = \int_{s_1}^{s_2} \kappa(s) \, ds = \int_{t_1}^{t_2} \kappa(t) \frac{ds}{dt} dt$$

This means that the vehicle yaw angle $\psi$ is generated when the vehicle moves along the curve of the curvature $\kappa(s)$ from s1 to s2 without a variation in sideslip.

Figure 5A:
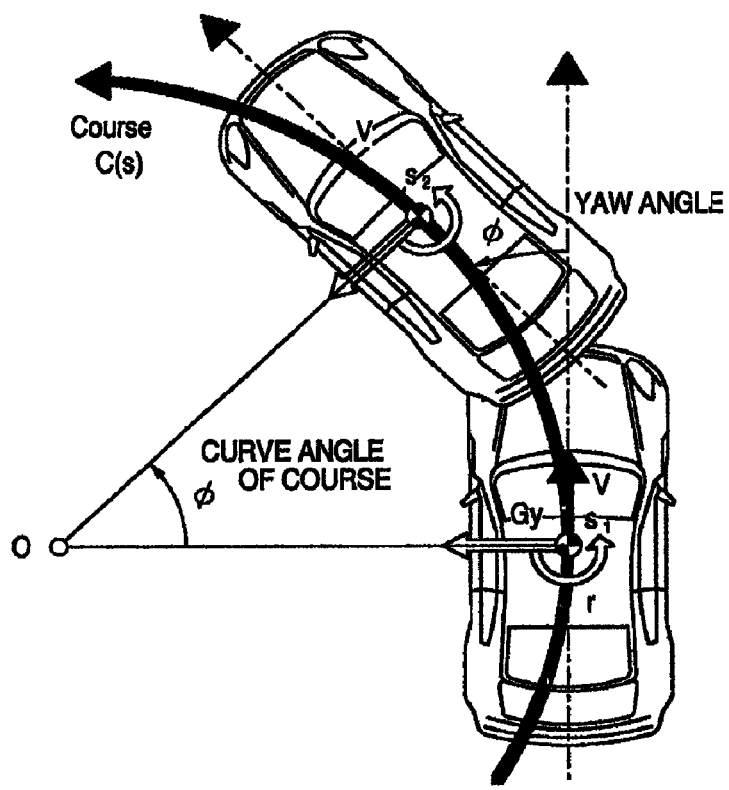
FIGS. 5A to 5B are views illustrating an ideal state where a vehicle turns without a sideslip.
Figure 5B:
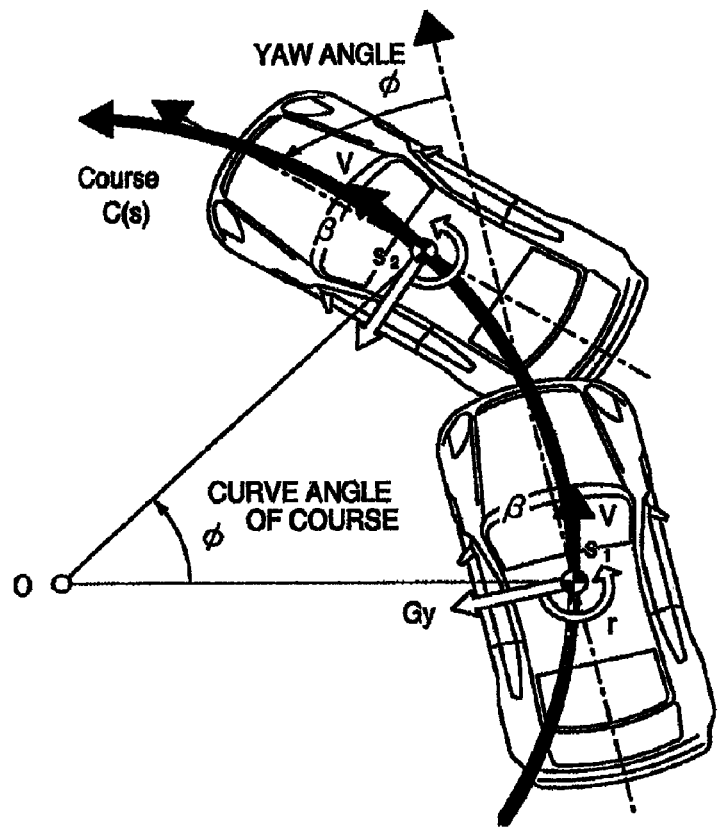

As shown in FIGS. 5A to 5B, the state without a variation in sideslip indicates a state where a difference between a vector (V) in a direction perpendicular to the curve (bold black curve indicating C(s)) and a vehicle velocity direction (direction indicated by the dashed line) is zero (FIG. 5A) or a state where an angle ($\beta$) called a sideslip angle is stable (FIG. 5B), which is considered as an ideal state where a revolution and a rotation of the vehicle cooperatively correspond to each other. In addition, the yaw angle generated in the ideal state is determined geometrically and is not directly involved with the vehicle dynamics. The details shown in FIGS. 5A to 5B are described in, for example, 'Vehicle dynamics and control' written by ABE Masato and published by Sankaido, First edition, Jul. 10, 1992, Third chapter.

<Deduction of Reference Yaw Moment>

When time t1 to t2 is taken to move from s1 to s2 as shown in FIG. 4, the yaw rate r_ref of the vehicle in such a motion state is $$\therefore r_{ref} = \frac{d\psi}{dt} = \frac{d\theta}{dt} = \frac{ds}{dt}\frac{d\theta}{ds} = u(t)\kappa(t) \qquad \text{[Equation 13]}$$

In addition, when the yaw angular acceleration (r_ref_dot) is obtained, $$\therefore \dot{r}_{ref} = \frac{d}{dt}(u(t)\kappa(t)) = \dot{u}(t)\kappa(t) + u(t)\dot{\kappa}(t) \qquad \text{[Equation 14]}$$

Here, a velocity in a direction where the vehicle moves is as below $$u(t) = V \qquad \text{[Equation 15]}$$

When the longitudinal acceleration of the vehicle is denoted by Gx, $$\dot{u}(t) = \dot{V} = G_x \qquad \text{[Equation 16]}$$

In addition, when the lateral acceleration of the vehicle is denoted by Gy, as shown in FIGS. 5A to 5B, the vehicle moving in a state where a variation in sideslip does not occur has a relationship $$r(t) = \frac{G_y}{V} \qquad \text{[Equation 17]}$$

and $$\kappa(t) = \frac{G_y}{V^2} \qquad \text{[Equation 18]}$$

When the time variation of the curvature is obtained by differentiating both sides, $$\dot{\kappa}(t) = \frac{\dot{G}_y V^2 - G_y 2V\dot{V}}{V^4} = \frac{\dot{G}_y V - 2G_y G_x}{V^3} \qquad \text{[Equation 19]}$$

Here, Gy_dot denotes the lateral jerk of the vehicle. When Equations 16, 18, and 19 are applied to Equation 14, $$\therefore \dot{r}_{ref} = \dot{u}(t)\kappa(t) + u(t)\dot{\kappa}(t) = G_x \frac{G_y}{V^2} + V\frac{\dot{G}_y V - 2G_y G_x}{V^3} \qquad \text{[Equation 20]}$$

$$= \frac{\dot{G}_y}{V} - \frac{G_x G_y}{V^2} \approx \frac{\dot{G}_y}{V}$$

Here, since a value obtained by dividing a value, obtained by multiplying the longitudinal acceleration by the lateral acceleration, by a square of the velocity in a second term is smaller than that of a first term, this is not considered in this embodiment. This may be considered when higher precise value is required.

Then, Equation 20 shows the yaw angular acceleration necessary for the vehicle moving in the ideal state. When the value of the yaw angular acceleration is multiplied by the yawing inertia moment Iz of the vehicle, the reference yaw moment is obtained (which generally corresponds to a relationship of a force f=m×acceleration α).

<Control Logic>

Next, a method for controlling the yaw moment of the vehicle being in a running state using the above-described reference yaw moment will be described. Here, the reference moment indicates a moment necessary for moving along the path in a state where the revolution and the rotation of the vehicle are cooperatively correspond to each other as shown in FIGS. 5A to 5B. When the moment is large, the vehicle rotates, and when the moment is small, the vehicle deviates from the path.

Figure 6:
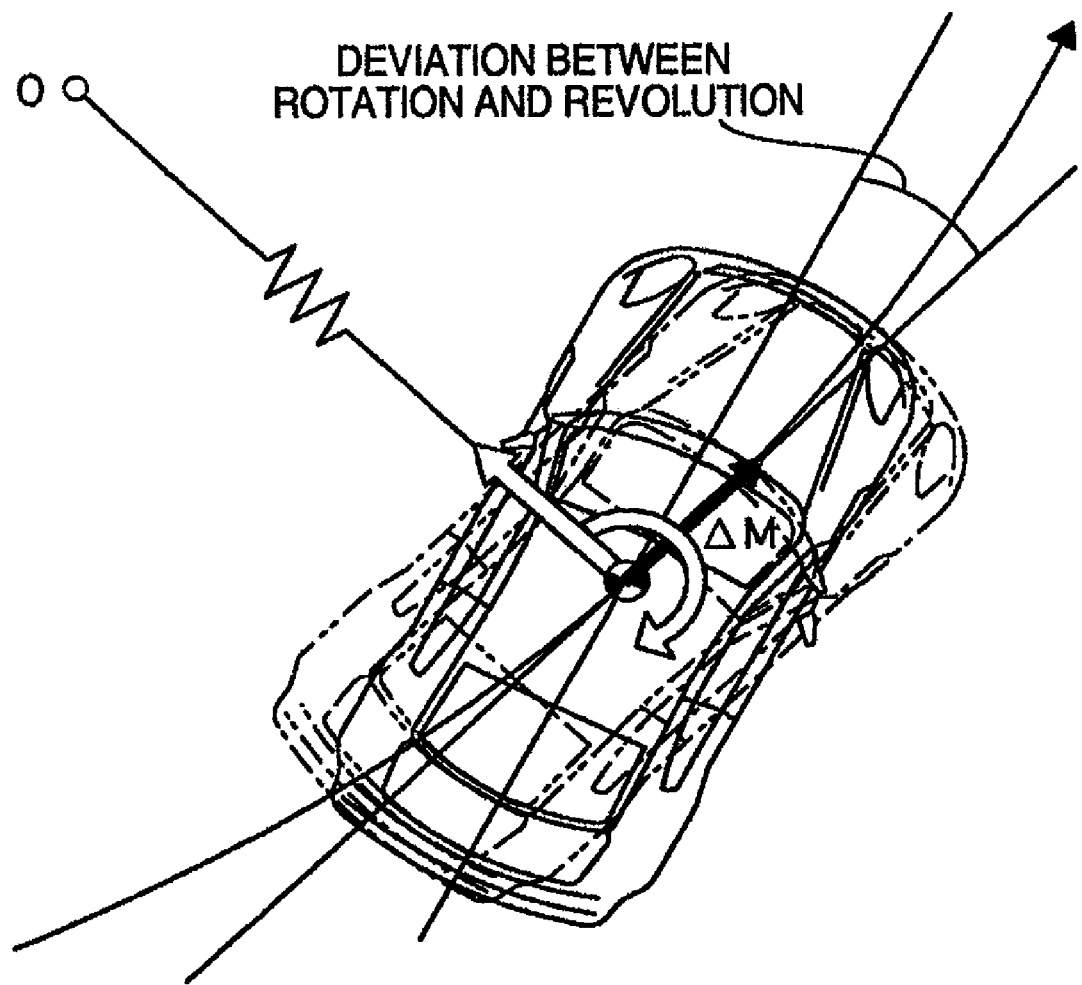
FIG. 6 is a view illustrating a state where a real vehicle having dynamical cornering characteristics and a state where a control yaw moment is necessary.

As shown in FIG. 6, a separation occurs in revolving motion and rotating motion of the real vehicle. This is because a characteristic of the vehicle varies in accordance with a variation in velocity, a variation in vertical load distribution, the disturbance, and the like. In this embodiment, correcting this separation (deviation shown in FIG. 6) is considered. Specifically, the following two are supposed. A first supposition is to correct a case that the lateral acceleration with respect to the yaw rate has a response delay as a variation amount of the sideslip angle in a transition state where the vehicle moving along a line performs a turning action or the vehicle performing the turning out action from a curved line (turning in and turning out assist). Another supposition is to restrict a case that lateral forces balance of the front and rear wheels is broken due to a certain reason so that the rotation more increases than the revolution (spin) (anti spin control).

An output angular acceleration obtained by the differential circuit 25 from the yaw rate obtained from the yaw rate sensor 38 mounted in the vehicle 0 or estimated by a difference between the left and right vehicle wheel velocity sensors is denoted by r_real_dot. When this value is multiplied by the yaw rate inertia moment Iz of the vehicle 0, it is possible to obtain the yaw moment acting on the current vehicle.

Consequently, a difference between the action yaw moment (Iz·r_real_dot) and the reference yaw moment (Iz·r_ref_dot) corresponds to a different yaw moment as a cause of the separation of the revolution and the rotation. Accordingly, $$\Delta M = k \cdot I_Z (\dot{r}_{ref} - \dot{r}_{real}) \qquad \text{[Equation 21]}$$

This is the yaw moment to be corrected. Here, k denotes a proportional gain. The reason why the proportional gain is necessary is that the reference yaw moment does not include the dynamics, and when a direct feedback (k=1) is applied thereto, there exists a divergence area. Accordingly, k needs to be adjusted necessarily so as to be 1 or less.

<Configuration of Control Logic>

Figure 7:
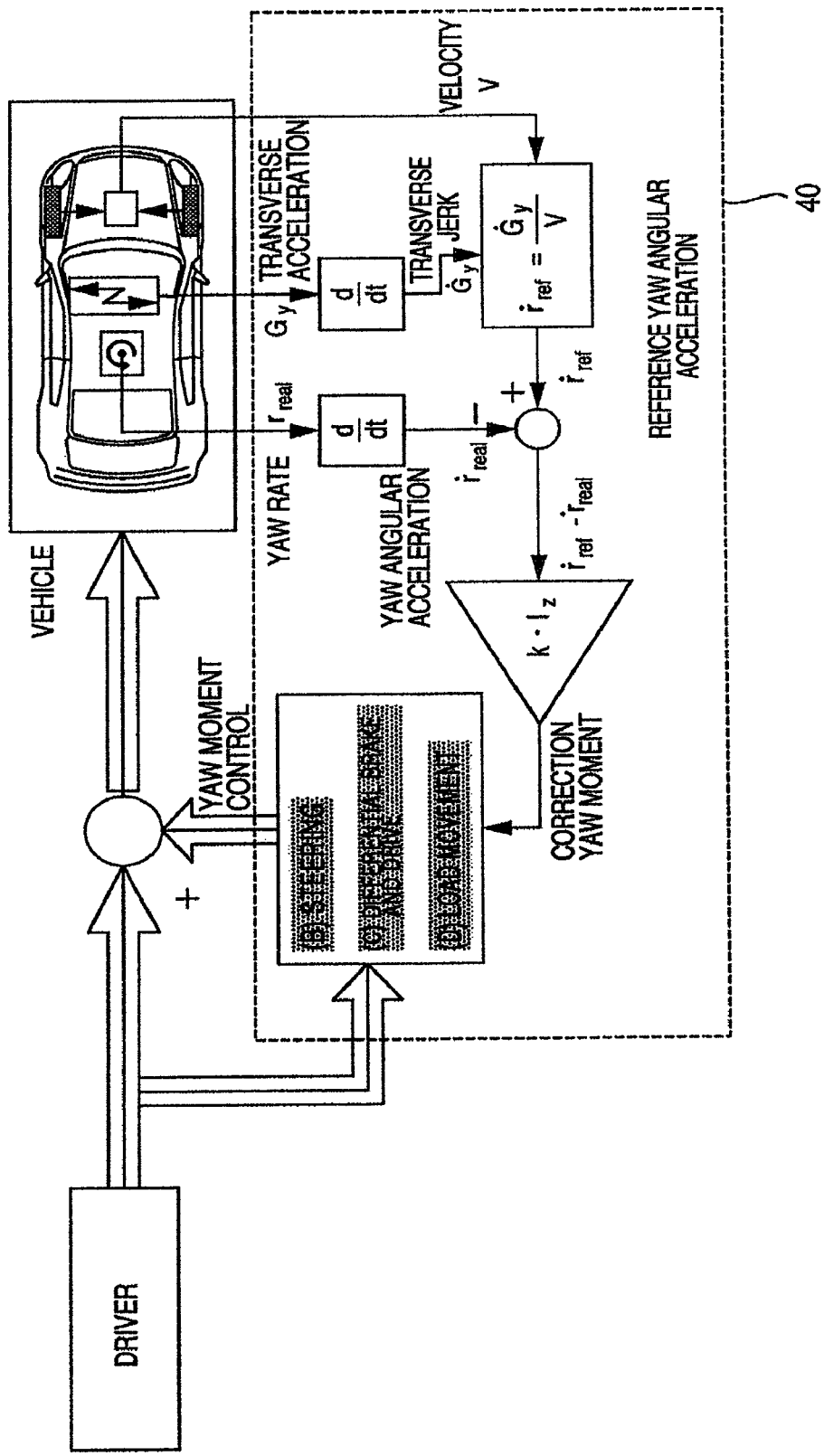
FIG. 7 is a diagrammatic view illustrating control logic in the motion control system for the vehicle.

FIG. 7 is a schematic view illustrating the configuration of the control logic according to this embodiment. The yaw moment of the vehicle is configured to be controlled on the basis of a value (Gy_dot/V) obtained by dividing the lateral jerk Gy_dot of the vehicle by the longitudinal velocity (V) of the vehicle. The yaw moment of the vehicle is configured to be controlled so that a difference between (Gy_dot/V) and (r_dot) becomes small by detecting the yaw angular acceleration (r_dot) of the vehicle.

In addition, a selection or a combination of 'Yaw Moment Addition in terms of Steering Operation', 'Yaw Moment Addition in terms of Left and Right Differential Brake and Drive Input', and 'Yaw Moment Addition in terms of Load Movement from Front Wheel to Rear Wheel' is determined in accordance with the driver's input. For example, when there is an accelerator input, 'Yaw Moment Addition in terms of Vertical Load Transfer from Front Wheel to Rear Wheel' which causing a deceleration is not carried or a total sum of 'Left and Right Differential Brake and Drive Input' is controlled in accordance with the driver's accelerator input. The series of processes are carried out by the central controller 40.

<Principle Justification Verification by Real Detection Result>

Next, a detection examination result of a correction yaw moment ΔM using the real vehicle is shown. The examination vehicle is a front-engine front-drive passenger car having a mass of about 1,500 [kg] and a yawing inertia moment of 2,500 [$kgm^2$], and has a lateral jerk detecting means and a yaw angular acceleration detecting means.

Figure 8:
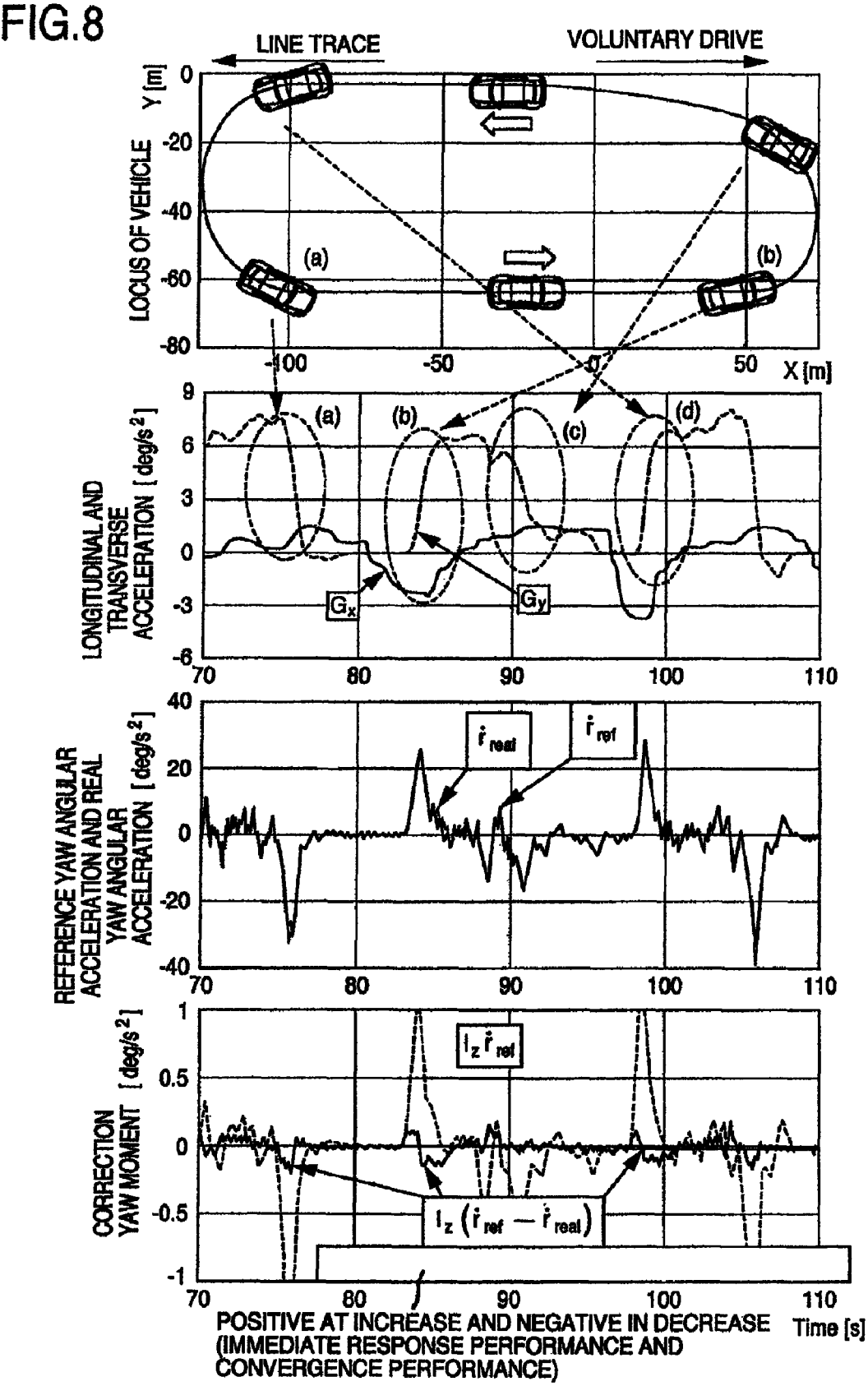
FIG. 8 is a diagrammatic view illustrating real measurement results of acceleration or deceleration motions in a vehicle.

FIG. 8 shows a locus (measurement value) of the vehicle, the longitudinal acceleration of the vehicle, the lateral acceleration of the vehicle, the reference yaw angular acceleration r_ref_dot obtained by dividing the lateral acceleration at that time by the velocity, the yaw angular acceleration r_real_dot of the real vehicle, and a difference between the respective angular accelerations when the driver performs a line trace task (on the left side in the drawing, (d)→(a)) and a voluntary drive (on the left side, (b)→(d)) in which the path is freely selected. A line to be traced is painted on a road surface on the left side of approximately X=−100 [m] of a test track.

Accordingly, the driver approaches from a side of X=0 [m] to a right corner. A moment indicating an escape from the left corner corresponds to positions around 75 [s(Time)] in the below two graphs, and a task is such that the vehicle enters a corner (b) from this position, escapes from a corner (c), and again enters a corner (d).

Although a velocity just before entering the line trace task (left) corner is approximately set to be 60 [km/h], the driver may use freely the brake and the accelerator. This corresponds to the second acceleration graph of FIG. 8. Accordingly, it is necessary to pay attention that this test is a result in accordance with a free acceleration.

As it may be estimated from. Equation 20, the yaw angular acceleration is highly relevant with the time variation of the curvature κ. Accordingly, the reference yaw angular acceleration is generated at a corner entrance to trace a line of which the curvature varies. As shown in the third drawing of FIG. 8, a difference between the reference yaw angular acceleration and the real yaw angular acceleration is very little, and the driver traces the line by accurately controlling the vehicle.

Here, the downmost drawing of FIG. 8 shows the correction yaw moment. Although the amount is little as a whole, the value is positive when the reference yaw angular acceleration increases up to a peak and the value is negative when the reference yaw angular acceleration decreases. It is obvious that immediate response performance and convergence performance of the vehicle motion can be improved in such a manner that as shown in Equation 21, this value is fed back by multiplying an adequate gain k thereto and the yaw moment is input thereto. In addition, as described above, since this test is carried out by the driver who performs the free acceleration or deceleration in terms of the brake or the accelerator, it is obvious that this embodiment is effective in the transient acceleration or deceleration state of the vehicle.

When a close control is carried out by the driver, since the driver performs an accurate control by using the brake, the steering, and the accelerator, in many cases, the correction yaw moment is not necessary. In other words, when the control is carried out in such a case, an unpleasant feeling may increase. For this reason, in order to more clearly verify the justification of the control logic (correction yaw moment calculation), it is verified whether the accurate correction yaw moment is calculated by performing an open loop test in which a steering operation is carried out left and right in a sine curve shape at a predetermined velocity.

Figure 9:
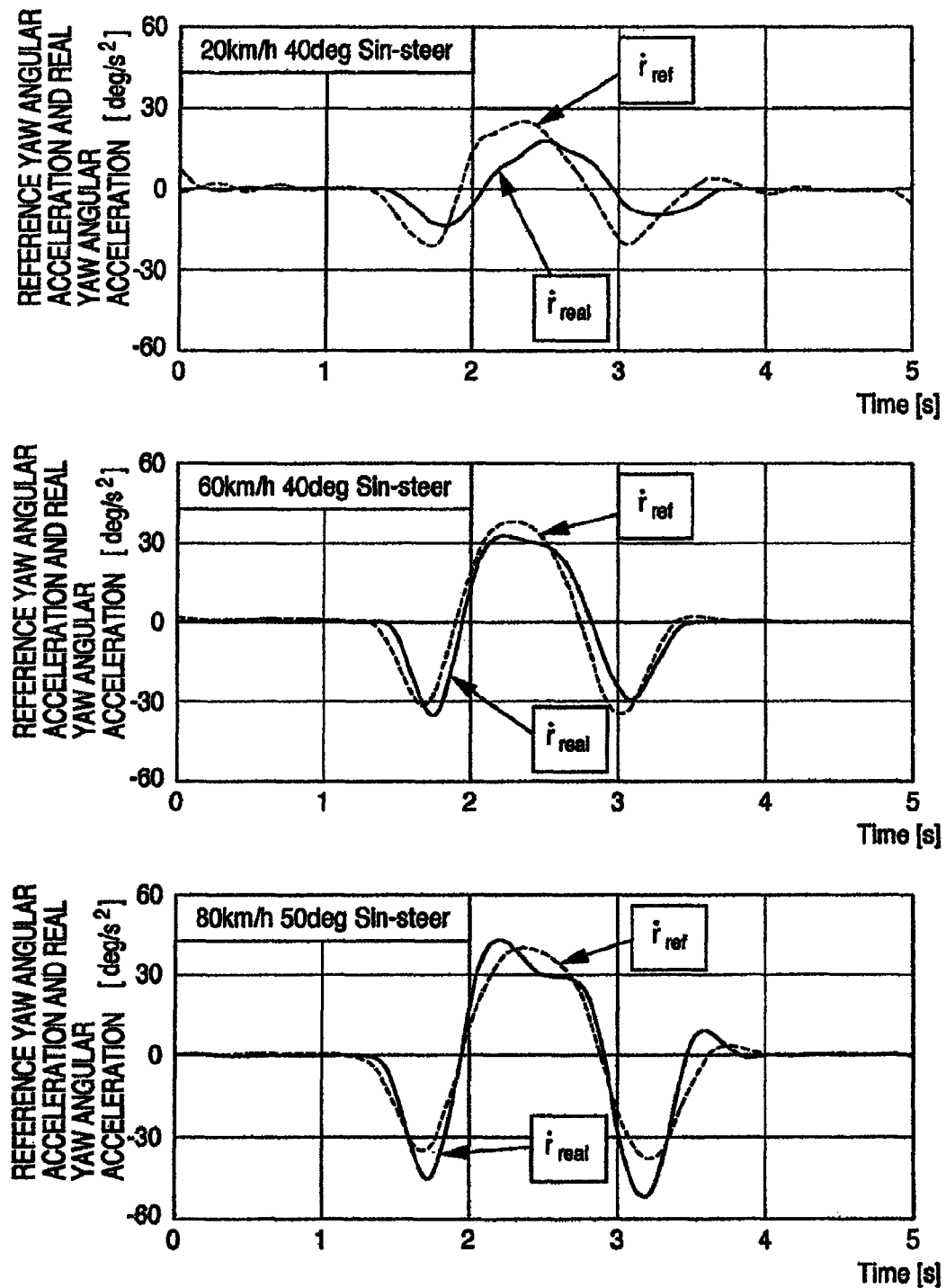
FIG. 9 is a diagrammatic view illustrating real measurement results of a reference yaw angular acceleration and a real yaw angular acceleration when a vehicle velocity and a steering condition are determined.

FIG. 9 is a view illustrating a case where the reference yaw angular acceleration of the real vehicle obtained by dividing the lateral acceleration by the velocity is compared with the real yaw angular acceleration obtained by differentiating the yaw rate of the real vehicle when the steering operation is carried out in a sine curve shape of 1 [Hz] by 40 [deg], 40 [deg], and 50 [deg] at vehicle velocities of 20 [km/h], 60 [km/h], and 80 [km/h].

As it is generally known, the lateral motion performance (dynamics) of the vehicle varies in accordance with the vehicle velocity. The real yaw angular acceleration has a low gain and a late phase when the vehicle velocity is slow. The gain increases in accordance with the increase of the vehicle velocity, and thus a late degree of the phase appears to be small (in fact, it is late). In such a case, the correction yaw moment needs to vary in accordance with the vehicle velocity.

Figure 10:
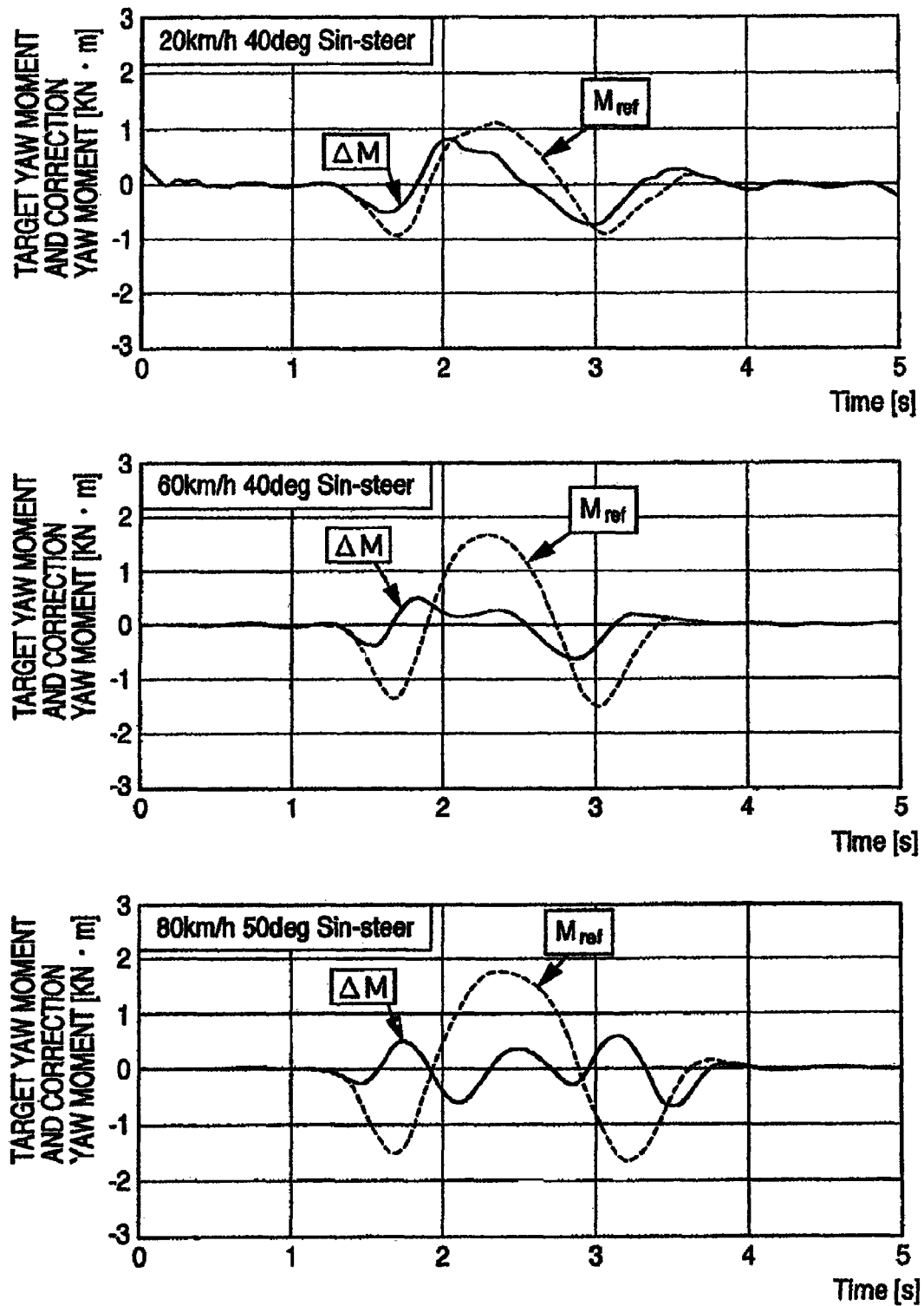
FIG. 10 is a diagrammatic view illustrating real measurement results of a target yaw moment and a correction yaw moment when the vehicle velocity and the steering condition are determined.

On the contrary, in the reference yaw angular acceleration, the steering operation, that is, the sine curve shape of 1 [Hz] stops and the phase is not late in accordance with a variation in velocity (this is because the vehicle dynamics are not used). Accordingly, although FIG. 10 shows the correction yaw moment signal (ΔM) obtained from a difference between the reference yaw angular acceleration and the real yaw angular acceleration, it is obvious that the correction amount includes a variation in dynamics with respect to the reference yaw moment.

<Summary>

The control and the function of the motion control system for the vehicle according to the above-described embodiment are summarized as below. That is, in order to decrease the difference between the yaw angular acceleration (r_real_dot) of the vehicle detected by the yaw angular acceleration detecting means of the vehicle and the value (Gy_dot/V=r_ref_dot) (reference yaw angular acceleration) obtained by dividing the lateral jerk (Gy_dot) of the vehicle by the longitudinal velocity (V) of the vehicle, (1) the difference between the lateral forces of the front wheel and the rear wheel is controlled by controlling the sideslip angles of the respective vehicle wheels of the vehicle, (2) a drive or brake torque difference between the left and right vehicle wheels is generated by controlling the longitudinal slip ratio of the respective vehicle wheels of the vehicle (in addition, it is general to control the longitudinal slip ratio in order to vary longitudinal forces (front and rear forces) of the respective vehicle wheels, which was known in the past), and (3) the difference between the lateral forces of the front and rear wheels varies in terms of the vertical load transfer between the front and rear wheels due to the longitudinal acceleration.

Since the yaw moment of the vehicle is controlled by using the three methods (in addition to a case where the three control methods are individually applied, the control methods may be, of course, applied in an appropriate combination), it is possible to adjust the control yaw moment amount in accordance with a variation in dynamics of the vehicle including the transient acceleration or deceleration state of the vehicle, and thus it is possible to realize a safety driving. Simply, a main feature of the invention is that the yaw moment is controlled on the basis of the difference between the real yaw angular acceleration (r_real) and the value (r_ref) obtained by dividing the lateral jerk of the vehicle by the longitudinal velocity by using the fact that the divided value is the yaw angular acceleration (yaw moment is obtained by multiplying the yaw angular acceleration by the yawing inertia moment Iz) necessary for realizing the motion shown in FIG. 5.

Next, the motion control system for the vehicle according to another embodiment will be described hereinbelow. As shown in FIG. 7, in the motion control system according to the above-described embodiment, the feedback control and the closed loop control based on the difference between the reference yaw angular acceleration and the real yaw angular acceleration of the vehicle are adopted.

On the contrary, in another embodiment, an open loop control, particularly, the yaw moment control in terms of the vertical load transfer is adopted. As described above, as disclosed in p. 54 to 60 of 'Improvement of Vehicle Motion Performance in terms of Yaw Moment Control' published by 'SOCIETY OF AUTOMOTIVE ENGINEERS OF JAPAN, INC., Vol. 47, No. 12, 1993, within a range in which the lateral force of the tire is proportional to the load, the yaw moment (Mzls) due to the acceleration or deceleration during a steady state cornering action is proportional to a value obtained by the lateral acceleration by the longitudinal acceleration as shown in Equation 22. Here, m denotes a vehicle mass, h denotes a height of gravity center point, and g denotes a gravity acceleration.

$$M_{zls} = -\frac{mh}{g} G_x G_y \quad \text{[Equation 22]}$$

Accordingly, when a necessary yaw moment is set to a value obtained by multiplying a value (Gy_dot/V·r_ref_dot), obtained by dividing the lateral acceleration (Gy_dot) of the vehicle by the longitudinal velocity (V) of the vehicle, by an inertia moment around a Z axis, the longitudinal acceleration realizing the control moment having the same profile as that of the necessary yaw moment is obtained. This may be regarded as an overall control of longitudinal motion and lateral motion which determines the lateral acceleration generated by the steering operation and the longitudinal acceleration by the brake and accelerator operation in accordance with the lateral acceleration.

That is, this is a method for obtaining a value as an index for enabling the system to automatically operate the brake and accelerator in accordance with the driver's steering operation. When a proportional constant is denoted by c, a command longitudinal acceleration Gxc is expressed as the following Equation 23.

$$I_z \dot{r}_{ref} = I_z \frac{\dot{G}_y}{V} = c \cdot -M_{zls} = -c \frac{mh}{g} G_{xc} G_y \quad \text{[Equation 23]}$$

$$\Rightarrow G_{xc} = -\frac{gI_z}{cmhV} \frac{\dot{G}_y}{G_y}$$

When the brake and accelerator is controlled on the basis of the Gxc value, since the moment in terms of the load Movement is generated to be close to the reference yaw moment, the correspondence between the rotation and the revolution is more improved, thereby improving operability and stabilizing the vehicle.

Upon being mounted to the vehicle and divided by the lateral acceleration (Gy) of the vehicle, in an initial turning state, in some cases, the lateral acceleration becomes a small value and the command longitudinal acceleration Gxc becomes a large value. In addition, the same case may occur upon decreasing the speed. In order to avoid such cases, as shown in Equation 24, it is sufficiently effective in practical engineering even when the command longitudinal acceleration Gxc is determined in such a manner that main information is obtained from the lateral jerk (Gy_dot) of the vehicle and other information is obtained from the velocity, the lateral acceleration or the function f(Gy, V) thereof, or dependent information and a gain KGyV stored in a map etc.

$$G_{xc} = f(G_y, V) \cdot \dot{G}_y = K_{G_y V} \cdot \dot{G}_y \quad \text{[Equation 24]}$$

Specifically, there are provided means for detecting the longitudinal velocity (V) of the vehicle and the lateral jerk (Gy_dot) of the vehicle, and the longitudinal acceleration of the vehicle is controlled on the basis of the value (Gy_dot/V) obtained by dividing the lateral jerk (Gy_dot) of the vehicle by the longitudinal velocity (V) of the vehicle so that the yaw moment of the vehicle is controlled in terms of the vertical load transfer. More specifically, the lateral acceleration (Gy) of the vehicle is detected, and the longitudinal velocity of the vehicle is controlled on the basis of a physical value proportional to a value obtained by dividing the value (Gy_dot/V), obtained by dividing the lateral jerk (Gy_dot) of the vehicle based on the detection by the longitudinal velocity (V) of the vehicle, by the lateral acceleration (Gy) of the vehicle so that the yaw moment of the vehicle is controlled in terms of the vertical load transfer between front and rear wheel.

While preferred embodiments has been described above, it should be understood, of course, that the invention is not limited thereto and various modifications or corrections can be made by those skilled in the art within the scope of the spirit of the invention and the appended claims.

What is claimed is:

1. A method for controlling a vehicle, said method comprising:
    dividing an input lateral jerk of the vehicle by an input longitudinal velocity of the vehicle;
    calculating a yaw angular acceleration based on the divided value;
    generating a control command for a yaw moment of the vehicle based on the calculated yaw angular acceleration;
    outputting the generated control command; and
    controlling motion of the vehicle based on the generated control command.

2. The method according to claim 1, wherein the control command for the yaw moment of the vehicle is generated based on the calculated yaw angular acceleration and a driver's input value.

3. The method according to claim 2, wherein the driver's input value includes any one of steering operation information, left and right differential brake and drive information, or load movement from rear wheel to front wheel information.

4. A method for controlling a vehicle, said method comprising:
    multiplying an input lateral jerk of the vehicle by a pre-stored gain;
    calculating a yaw angular acceleration based on the multiplied value;
    generating a control command for a yaw moment of the vehicle based on the calculated yaw angular acceleration;
    outputting the generated control command; and
    controlling motion of the vehicle based on the generated control command.

5. The method according to claim 4, wherein the control command for the yaw moment of the vehicle is generated based on the calculated yaw angular acceleration and a driver's input value.

6. The method according to claim 5, wherein the driver's input value includes any one of steering operation information, left and right differential brake and drive information, or load movement from rear wheel to front wheel information.

* * * * *